April 5, 1960

A. E. COHEN ET AL 2,931,907

RADIATION DETECTOR AND METHOD FOR CHECKING
THE CALIBRATION THEREOF
Filed Jan. 6, 1958

INVENTOR,
ABRAHAM E. COHEN
MARTIN H. JACHTER.
BY
Harry M. Saragovitz
ATTORNEY.

United States Patent Office 2,931,907
Patented Apr. 5, 1960

2,931,907

RADIATION DETECTOR AND METHOD FOR CHECKING THE CALIBRATION THEREOF

Abraham E. Cohen, Wanamassa, and Martin H. Jachter, Middletown, N.J., assignors to the United States of America as represented by the Secretary of the Army Application January 6, 1958, Serial No. 707,447

1 Claim. (Cl. 250—83.6)

(Granted under Title 35, U.S. Code (1952), sec. 266)

The invention described herein may be manufactured and used by or for the Government for governmental purposes without the payment of any royalty thereon.

This invention relates to apparatus for the measurement of radiation. More specifically, the invention relates to an improved radiation measuring instrument having a multi-range sensitivity, the said instrument having means therein for checking its calibration.

There is a particular need for simplified radiation measuring apparatus having a multi-range sensitivity in nuclear work. Instruments in the past have required complicated circuitry to attain different ranges of sensitivity. In these prior instruments the grid circuit of the electron tube circuit had to be varied to change the scale range. This introduced high impedance leakage path, and required a complex switch in the input circuit and additional circuit elements. For checking calibration, prior instruments required the employment of a standard radioactive source.

The present device, on the other hand, utilizes means for varying the ranges of sensitivity of a radiation measuring instrument by changing the collection potential, or sweep-out voltage, on the wall of the radiation sensing element of the apparatus. Furthermore, the invention herein comprises a method for checking the calibration of said instrument by measuring the radiation of an unknown radioactive source on different ranges of sensitivity and comparing the meter readings.

It is an object of the present invention to provide novel field radiation measuring instruments operated entirely with low voltages and having improved means for varying the sensitivity thereof.

A further object of the invention is to provide a simple means for checking the calibration of the above instruments.

Generally, the objects of the invention are accomplished by varying the voltage supply on the outer electrode of the sensing element and maintaining the grid circuit constant.

Other objects and many attendant advantages of the invention will become readily apparent as the same becomes better understood from the following detailed description and the accompanying drawings, wherein.

Figure 1:
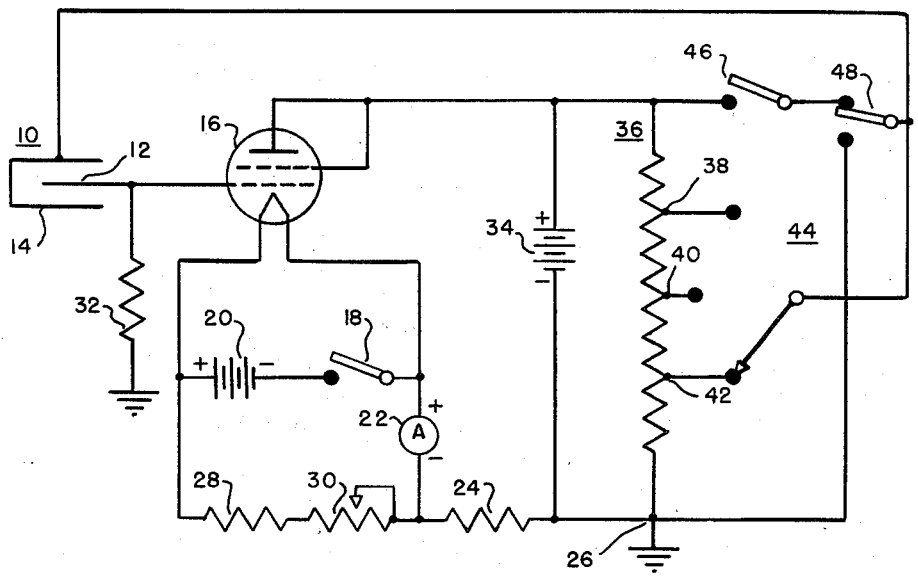
Fig. 1 is a schematic circuit diagram of the invention.

Referring now to Fig. 1, there is shown a circuit diagram of a radiation detector instrument employing a radiation sensing element 10 as a detector in conjunction with an electrometer circuit for amplifying and measuring the output of the radiation sensing element 10, which is an ionization chamber having a center electrode 12 and an outer electrode 14. The radiation sensing element 10 may be any element in which the output current thereof is a nonlinear function of the radiation incident thereon. Thus, for example, ionization chambers operating in the unsaturated region or solid state detectors operated in a non-linear manner may be utilized. An unsaturated ionization chamber has been used to measure incident X-ray and gamma radiation ranging from one tenth to two thousand roentgens per hour.

The ionization chamber 10 is connected to an electronic amplifying circuit which includes tube 16, of the battery operated type, having a control grid, a screen grid, a plate and a cathode. The screen grid is connected directly to the plate for triode operation of the tube. The center electrode 12 of the ionization chamber is connected to the control grid of the amplifying tube.

In the amplifying and measuring circuit comprising tube 16 and ammeter 22, a positive potential is applied to the plate of the tube by a battery 34 connected between said plate and a grounded terminal 26. The filament of the tube is connected in series with a switch 18 and a source of voltage 20. The filament is also connected through ammeter 22, which measures the output of the device, and a cathode resistor 24 to the grounded terminal 26. Resistor 28 and rheostat 30 are connected in series with ammeter 22 and the filament battery 20, as shown. The control grid is connected to ground through a high resistance 32.

A tapped bleeder resistor 36 is connected across battery 34 to provide a variable voltage source. A variety of instrument sensitivities can be obtained by providing voltage taps 38, 40 and 42 on the bleeder resistance. The particular tap desired is selected by means of a switch 44 which is connected to the outer electrode 14 of the ionization chamber 10.

Check switch 46 is normally open. When in its closed position it connects the outer electrode 14 directly to the positive terminal of battery 34.

Zero switch 48 is normally set in its upper position as shown. When switch 48 is placed in its lower position it connects the outer electrode 14 directly to ground. This removes the collection potential from ionization chamber 10, resulting in desensitization thereof and permitting zeroing of the instrument in a radiation field. Zeroing is then accomplished by adjusting rheostat 30 until the pointer on the ammeter indicates zero.

The incident radiation is to be measured in terms of current flow through the cathode circuit. A typical operation of the apparatus will now be described. Initially, when filament power is applied to tube 16 through switch 18, tube 16 will conduct current through the cathode load, which includes resistors 24, 28 30 and ammeter 22. This applies a negative bias to tube 16.

The system is now ready for its measuring operation. The unsaturated ionization chamber current flow is dependent upon the voltage existing across it and the intensity of penetrating radiation impinging on the ionization chamber. Adjustment of switch 44 and selection of the desired tap on resistor 36 will apply different sweep-out voltages on outer electrode 14 of ionization chamber 10. When the radiation penetrates ionization chamber 10, a current flows through the ionization chamber 10 and grid resistor 32, thereby developing an input signal voltage superimposed on the cathode bias.

By applying different sweep-out voltages from the voltage source 34 through switch 44 and bleeder resistor 36 to the outer electrode 14 of the ionization chamber 10, it is possible, for a fixed radiation intensity, to increase the collection of the ionization chamber and consequently the current flow through grid resistor 32. The greater the current flow through grid resistor 32, the greater will be the voltage developed across grid resistor 32 and applied to the electrometer input. Increasing the radiation intensity for a given chamber potential will drive the grid more positive, thereby increasing the space current in the amplifying and measuring circuit, resulting in an increased indication in ammeter 22.

Figure 2:
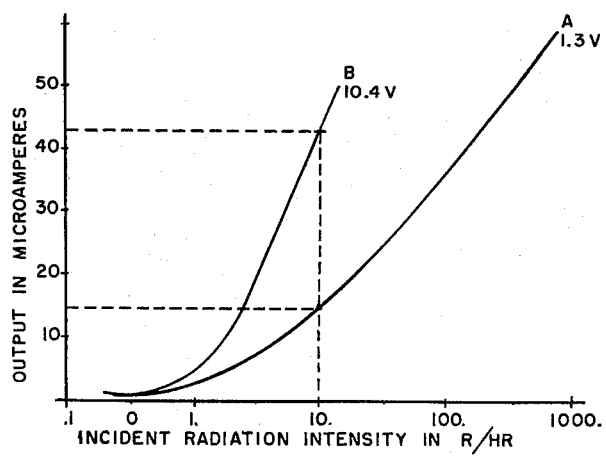
Fig. 2 shows two response curves, of a family of curves, of a circuit such as that of Fig. 1.

Fig. 2 illustrates the response characteristics of the circuit of Fig. 1. The curves A and B are two of a family of response curves obtained by varying the collection potential on ionization chamber 10, and show the resulting output in microamperes obtained in the amplifying and measuring circuit at different radiation inputs. The portion of output current as indicated by ammeter 22 in microamperes has been plotted against the incident radiation intensity in roentgens per hour. The radiation intensity is plotted logarithmically along the abscissa and the output current is plotted linearly along the ordinate. Curve A represents the sweep-out voltage applied to outer electrode 14 when switch 44 is connected to tap 42. Curve B represents the sweep-out voltage when check switch 46 is closed and the full potential of battery 34 is applied to outer electrode 14.

The meter 22 may have two scales inscribed thereon, a high range and a low range corresponding respectively to sweep-out voltages A and B.

To check the calibration of the instrument, ammeter 22 is first zeroed, after which ionization chamber 10 is directed toward a radioactive source, the intensity of which need not be known. Sweep-out voltage A (approximately 1.3 volts) is applied to the outer electrode 14. This will afford some deflection on ammeter 22; in this example 14.5 microamperes, which corresponds to 10 roentgens per hour will be read on the high range scale. Sweep-out voltage B (10.4 volts), the full potential of battery 34, is then applied to the outer electrode 14 by closing switch 46. The stability of curve B is reliable since it is mainly dependent on a stable, mercuric oxide battery 34. Ammeter 22 would now indicate 42.5 microamperes on the low range scale which also corresponds to 10 roentgens per hour.

Briefly, checking for the same radioactivity on both the high and low scales would then indicate:

a. Whether there had been any change in the physical response of the ionization chamber;

b. Whether the gain of the electron tube had changed;

c. Whether any change had occurred in the ionization chamber; and d. Whether any component or parameter other than the above had changed to affect circuit performance and prevent the instrument from indicating correctly on the low scale what had appeared on the high scale.

Checking this instrument by this method is equivalent to calibration, since in conventional calibration a calibrated radioactive source is employed and the instrument variation due to ionization chamber, amplifying and measuring circuit or component variations is corrected by adjusting some component parameter.

This method has the advantage of not requiring a calibrated radiation source to be maintained and carried, but any source of radioactivity such as fall out, X-ray or gamma sources found in the course of operation may be employed for a calibration type check of the instrument. Furthermore, sources need not be stored or maintained in stock since momentary closing of check switch 46 will put a noise pulse into the ionization chamber to check the chamber as a capacitor in the circuit.

Typical circuit components which have been used in the construction of a circuit such as illustrated in Fig. 1 are:

Tube 16 _____ JAN–5886.
Mercuric oxide battery 20 _____ 1.3 volts.
Mercuric oxide battery 34 _____ 10.4 volts.
Resistor 32 _____ $6 \times 10^{10}$ ohms.
Resistor 28 _____ 4.3K ohms.
Resistor 24 _____ 6.8K ohms.
Potentiometer 30 _____ 1.0K ohms.
Resistor 36 _____ 10 megohms.

The sensing element 10 utilized in this typical circuit was an unsaturated ionization chamber.

The above values are intended as illustrative rather than limiting and it will be readily apparent that components other than those listed could be used.

While there has been described what is at present considered to be a preferred embodiment of the invention, it will be obvious to those skilled in art that various changes and modifications may be made therein without departing from the invention, and it is therefore aimed in the appended claim to cover all such changes and modifications as fall within the true spirit and scope of the invention.

What is claimed is:

Radiation measuring apparatus comprising, in combination, an ionization chamber having center and outer electrodes and adapted to operate in an unsaturated condition with a plurality of different sweep-out voltages, an electrometer comprising an amplifying and measuring circuit having an input circuit connected to said center electrode and having a cathode circuit adapted to produce an output current varying with the amount of ionization occurring in said ionization chamber and the sweep-out voltage applied thereto, an ammeter in said cathode circuit having a plurality of scales respectively calibrated to correspond to said sweep-out voltages, means in said cathode circuit to apply a bucking potential to said ammeter to neutralize the current normally flowing therethrough, means for zeroing said instrument in a radiation field including means for connecting the outer electrode of said ionization chamber to ground, a stable voltage source, a tapped bleeder resistor connected across said source, and means for alternately applying different values of sweep-out voltage from said bleeder resistor to the outer electrode of said ionization chamber, whereby the indications on said ammeter in response to each sweep-out voltage, when said ionization chamber is excited by a constant radiation, can be compared to check the calibration of said instrument.

References Cited in the file of this patent

UNITED STATES PATENTS

| | | |
|---|---|---|
| 2,443,857 | Herzog | June 22, 1948 |
| 2,465,938 | Shonka | Mar. 29, 1949 |
| 2,495,072 | Molloy | Jan. 17, 1950 |
| 2,605,429 | Herndon et al. | July 29, 1952 |
| 2,850,643 | Hill | Sept. 2, 1958 |
| 2,861,191 | Chao et al. | Nov. 18, 1958 |